United States Patent
Yoon et al.

(10) Patent No.: US 7,313,167 B2
(45) Date of Patent: Dec. 25, 2007

(54) SIGNAL-TO-NOISE RATIO ESTIMATION OF CDMA SIGNALS

(75) Inventors: Young C. Yoon, San Diego, CA (US); Shiau-He Shawn Tsai, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1041 days.

(21) Appl. No.: 10/260,650

(22) Filed: Sep. 30, 2002

(65) Prior Publication Data

US 2004/0203397 A1 Oct. 14, 2004

(51) Int. Cl.
H04B 1/707 (2006.01)
H04B 1/10 (2006.01)
H04Q 1/20 (2006.01)

(52) U.S. Cl. ............... 375/148; 375/227; 455/63.1; 455/67.13

(58) Field of Classification Search ............ 375/144, 375/148, 227, 260; 455/522, 69, 67.13, 63.1, 455/67.11, 452.1
See application file for complete search history.

(56) References Cited

U.S. PATENT DOCUMENTS

| | | | |
|---|---|---|---|
| 5,295,159 A * | 3/1994 | Kerpez | 375/260 |
| 6,229,842 B1 * | 5/2001 | Schulist et al. | 375/148 |
| 6,275,485 B1 | 8/2001 | Padovani | |
| 6,470,047 B1 * | 10/2002 | Kleinerman et al. | 375/232 |
| 6,674,792 B1 * | 1/2004 | Sugita | 375/148 |
| 2001/0006898 A1 | 7/2001 | Bae | |
| 2001/0040880 A1 | 11/2001 | Chen et al. | |

* cited by examiner

*Primary Examiner*—Young T. Tse
(74) *Attorney, Agent, or Firm*—Coats & Bennett, P.L.L.C.

(57) ABSTRACT

An improved approach to noise estimation permits, for example, tighter closed-loop power control in a wireless communication network with attendant improvements in transmit power efficiency and network capacity. In an exemplary embodiment, the received signal-to-noise ratio (SNR) of a data signal is estimated based on noise samples obtained from one or more other signals received in association with the data signal. In general, these associated signals are characterized by the receiver's ability to extract like valued samples from them, such that pairs of these like valued signal samples may be subtracted, thereby canceling their deterministic signal components and leaving only difference values representative of the non-deterministic noise components of the signal samples. Obtaining difference values from more than one associated signal increases the sample size of difference values used in noise estimation, thereby improving the statistical basis for noise estimation and, therefore, the accuracy of SNR estimation.

30 Claims, 11 Drawing Sheets

SIGNAL-TO-NOISE RATIO ESTIMATION OF CDMA SIGNALS

BACKGROUND OF THE INVENTION

The present invention generally relates to wireless communication networks, and particularly relates to improved closed-loop power control through more accurate estimation of signal-to-noise ratios for received signals.

Most wireless networks employ power control to control the transmit power of both base stations and mobile stations. At base stations, forward link power control ideally limits the transmit power directed to individual mobile stations to the levels needed to achieve minimally acceptable received signal quality at each of the mobile stations. Transmitting to a mobile station at a power above the level needed to achieve acceptable received signal quality wastes the limited total transmit power at the base station, thereby reducing its capacity to serve the greatest possible number of mobile stations, and unnecessarily increases interference at surrounding base stations. Similarly, mobile stations transmitting with excess power on the reverse link unnecessarily wastes power at the mobile stations, and undesirably raises the "noise floor" at the base station.

In a common approach to forward link power control, mobile stations provide power control feedback to transmitting base stations. Such feedback depends on received signal quality at the mobile stations. Each mobile station transmits power control commands to one or more supporting base stations, such that forward link transmit power is maintained at approximately the level required to a targeted received signal quality at the mobile station, even during dynamically changing reception conditions.

Any inaccuracy in the mobile station's determination of received signal quality manifests itself in inaccurate forward link transmit power control. For example, if the mobile station underestimates the signal-to-noise ratio (SNR) of the received signal, its comparison of the estimated SNR with the target SNR may suggest a greater than actual shortfall in received signal quality. Consequently, the mobile station may request more transmit power from the base station than necessary to meet the targeted signal quality. The amount by which requested transmit power exceeds the actual power needed represents an inefficiency because the wasted power could otherwise be used to support additional mobile stations.

BRIEF SUMMARY OF THE INVENTION

The present invention comprises a method and apparatus for estimating the noise variance (which is referred to as noise estimation hereafter) in a received signal of interest using one or more other received signals transmitted with the signal of interest. Preferably, these other signals are transmitted over the same period for which interference characteristics for the signal of interest are to be determined. In at least one exemplary embodiment, noise estimation can be improved by increasing the number of independent and identically distributed noise samples available for noise estimation over a given estimation interval based on obtaining noise samples from a plurality of received signals transmitted in association with the received signal of interest. In this manner, the number of available noise samples available for estimation purposes increases as a multiple of the number of received signals used for noise estimation.

Such estimation operations yield improvements in noise estimation based on the improved statistical accuracy gained by increasing the number of noise samples. In an exemplary embodiment, the present invention enables a CDMA receiver to generate more accurate estimates of noise for a traffic channel signal based on obtaining noise samples from selected overhead channel signals, such as paging and synchronization channel signals, simultaneously with the traffic channel. Because of the orthogonality and the simultaneous transmission of the overhead channel signals, generally referred to herein as "messaging" channel signals, noise values obtained from such signals serve as direct surrogates for noise in the traffic channel signal.

Thus, a CDMA receiver according to the present invention selects one or more messaging channel signals to estimate noise for a traffic channel signal. The number of such signals selected may be based on a desired number of noise samples to be obtained over the noise estimation interval. In an exemplary embodiment for cdma2000 networks, a mobile station selects two or more such messaging channel signals for traffic channel signal noise estimation in each one of a plurality successive 1.25 ms Power Control Group (PCG) frames. In this manner, the mobile station obtains an accurate noise estimate for the traffic channel signal in each PCG frame, thereby enabling tighter closed-loop control of the network's forward link transmit power. Such power control improvements enhance network efficiency by constraining forward link power more closely to the actual minimum power needed to ensure sufficient received signal quality at the mobile station.

Additionally, the mobile station or, more generally, the involved radio receiver, may select the particular messaging channel signals to use for noise estimation based on their suitability for use in noise estimation operations. Such suitability determination primarily considers whether a given messaging channel signal offers the opportunity to obtain a sufficient number of pairs of like valued samples from the channel over the noise estimation interval. The need for like valued sample pairs derives from the desire to simplify noise estimation. With pairs of like valued samples, one need only subtract or otherwise manipulate the like valued samples in each pair such that the deterministic signal components are canceled, thereby leaving only the noise components of interest.

Thus, the present invention enables the use of such messaging channel signals for noise estimation based on one or more exemplary approaches to obtaining pairs of like valued samples from a given messaging channel signal. Because the messaging channel signals are modulated signals, i.e., signals carrying time-varying phase and/or frequency modulation information, obtaining like valued sample pairs from such signals requires specific sampling techniques. Moreover, the particular sampling technique used may vary depending upon the particular messaging channel signal being sampled.

As such, a receiver according to the present invention may select one or more messaging channel signals for use in noise estimation based on the suitability or convenience of that signal for the purpose of obtaining pairs of like valued samples. Note that the selection of signals may depend upon a number of factors, such as the current radio configuration of the receiver. For example, in cdma2000 networks, the spreading gain applied to one or more of the messaging channel signals varies over one or more different radio configurations. Therefore, a given messaging channel signal might not be suitable for use in noise estimation while operating in one radio configuration, but may be if operating in another radio configuration.

In this regard, the present invention is not limited to a particular sampling technique. Indeed, the present invention encompasses different sampling techniques that may be applied to different messaging channel signals in dependence on their particular characteristics. For example, in an exemplary embodiment, the receiver selects a messaging channel based on that signal having repeating symbol values. With repeated symbol values, the receiver obtains pairs of like valued samples by sampling the repeated symbol values. Preferably, the receiver obtains the pairs of like valued samples based on obtaining successive samples from adjacent symbol pairs. Adjacent symbol sampling minimizes the time separation of samples in each pair, which enhances the cancellation of deterministic signal components by ensuring that each sample in the pair exhibits the same "channel" effects. That is, the radio propagation channel changes over time and minimizing the time difference between otherwise identical sample values reduces such time varying channel effects.

In other exemplary embodiments, the receiver selects a messaging channel signal based on the relationship between that channel's spreading gain relative to the signal of interest, e.g., relative to the traffic channel signal. For example, where the selected messaging channel signal has a spreading gain that is twice the spreading gain of the traffic channel signal, say 128 chips/symbol versus 64 chips/symbol, the receiver may obtain pairs of like valued samples by despreading the messaging channel signal based on the spreading gain of the traffic channel signal. Thus, despreading each 128 chip symbol as two like valued 64 chip symbols enables the receiver to obtain pairs of like valued samples irrespective of whether the messaging channel signal actually has repeating symbol values.

In still other exemplary embodiments, the receiver selects a messaging channel signal based on the relative power level of that signal. That is, if messaging channel signal is received at a relatively high power, then received symbol decisions may be made with relatively high confidence. In other words, if the signal has sufficiently high power, it may be despread or otherwise demodulated with few errors. As such, each "soft" decision value obtained from the signal may be converted into a "hard" decision value, thereby removing the value's uncertainty. Then, the hard values may be compensated for propagation channel effects, such as by compensating the amplitude of the hard decision values for channel attenuation. In any case, the compensated values may then be subtracted from the corresponding soft value samples, thereby canceling deterministic signal components and leaving only the noise.

Regardless of the particular signals selected, the present invention permits noise estimation over a given estimation interval based on obtaining noise samples from one or more messaging channel signals. By enabling the use of such modulated signals in noise estimation operations, the number of signals available for noise estimation is expanded, thereby expanding the potential number of noise samples obtained over the estimation interval.

Those skilled in the art therefore will recognize that the present invention provides noise estimation improvements that have value across a range of applications. Of course, certain exemplary embodiments of the present invention may have particular advantages in certain applications, such as when used for noise estimation in wireless communications.

DETAILED DESCRIPTION OF THE INVENTION

Figure 1:
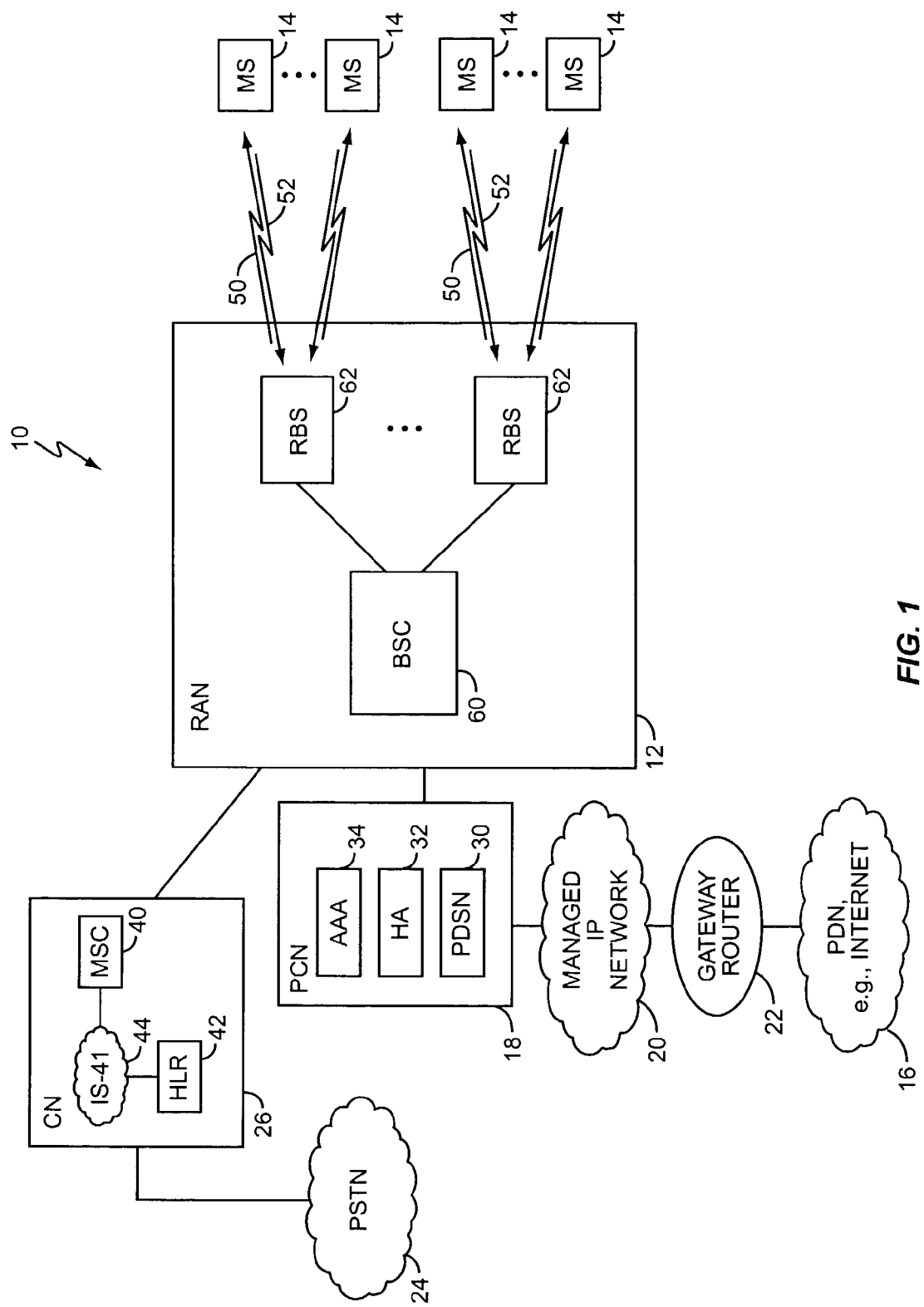
FIG. 1 is a diagram of an exemplary wireless communication network in which the present invention may be practiced.

FIG. 1 illustrates an exemplary wireless communication network 10, which provides a framework for discussing the present invention. While the illustrated network 10 depiction of network is generally consistent with cdma2000 wireless network standards, those skilled in the art should understand that the present invention is not limited to such networks and may be practiced in a variety of other network types, such as those based on Wideband CDMA (WCDMA) standards.

Radio Access Network (RAN) 12 of network 10 communicatively couples one or more mobile stations 14 to other communication networks. Here, RAN 12 supports packet-data communication by coupling mobile stations 14 to Packet Data Network (PDN) 16, e.g., the Internet, through a Packet Core Network (PCN) 18, which is associated with a managed IP network 20 and gateway router 22. RAN 12 supports circuit-switched applications, such as traditional voice and facsimile applications by coupling mobile stations 14 to the Public Switched Telephone Network (PSTN) 24 through a Core Network (CN) 26.

An exemplary PCN 18 includes one or more Packet Data Serving Node (PDSNs) 30, a Home Agent (HA) 32, and an Authentication, Authorization, and Accounting (AAA) server 34, while the exemplary CN 26 includes one or more mobile switching centers (MSCs) 40, a Home Location Register (HLR) 42, and an IS-41 network 44. Those skilled in the art will appreciate that other network standards might define other arrangements and/or use different nomenclature. Regardless, while such details of network 10 are of general interest, they generally are not germane to the present invention.

Figure 2:
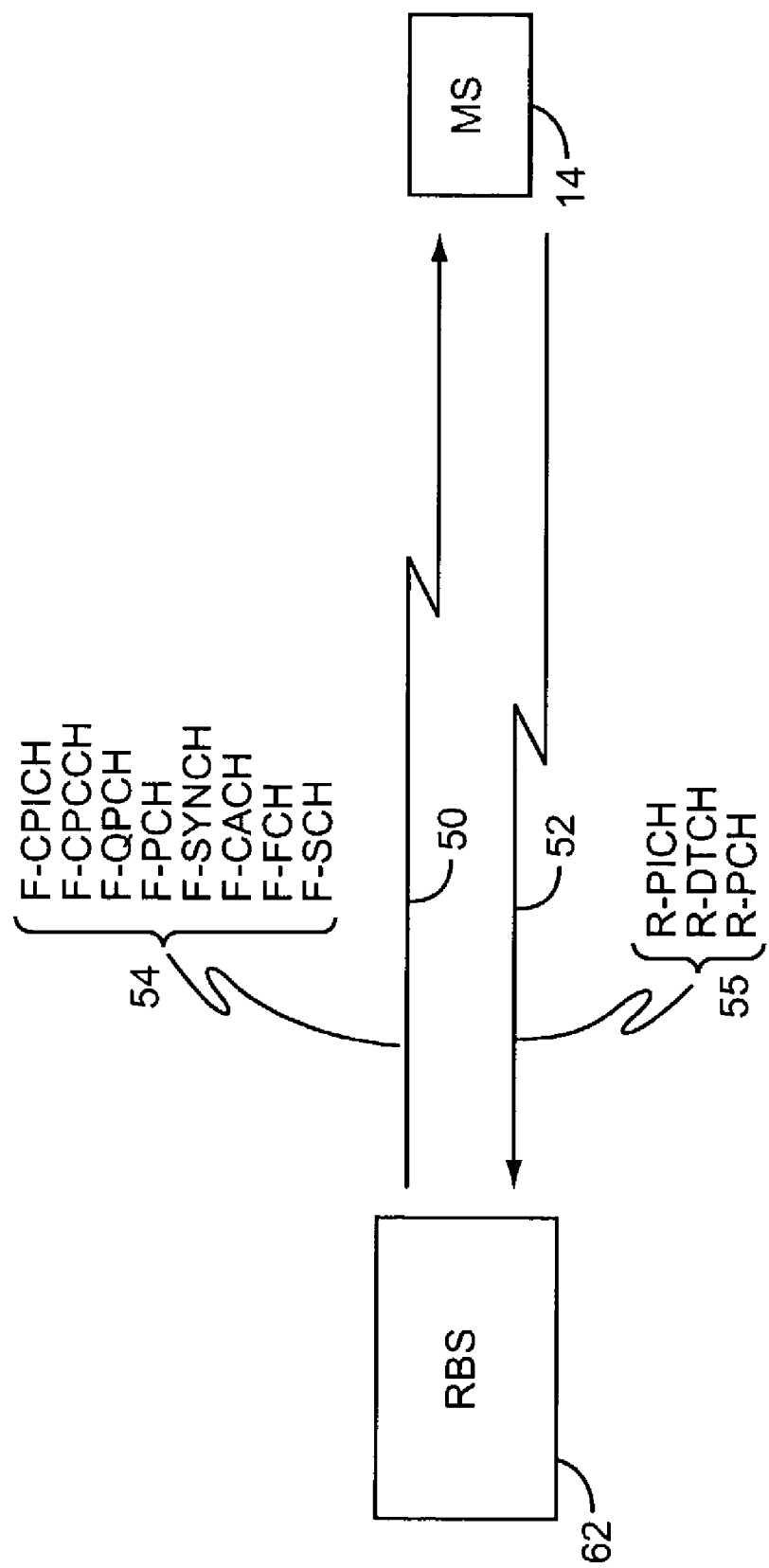
FIG. 2 is a diagram of exemplary forward and reverse link channel sets.

Of more interest regarding the present invention, the RAN 12 supports bi-directional radio communication with the mobile stations 14 through a forward link 50 and a reverse link 52 as shown in FIG. 2. In an exemplary embodiment, RAN 12 comprises at least one Base Station Controller (BSC) 60 supporting one or more Radio Base Stations (RBSs) 62 that provide the transmitter and receiver resources for wirelessly communicating with the mobile stations 14 via the forward and reverse links 50 and 52, respectively. The present invention provides for greater efficiency in managing the transmit powers used for these forward and/or reverse links by enabling more precise power control through improved noise estimation for one or more received signals on which such power control is based.

Forward link 50 comprises a set of forward link channels 54 and reverse link 52 comprises a set of reverse link channels 55. Each of these sets of channels includes both shared channels and dedicated channels, and the number of active channels actually in the forward or reverse link channel sets 54 and 55 depends on the number of mobile stations 14, and the particular operating modes or activities of those mobile stations 14. Note that, depending upon the air interface used, e.g., CDMA, TDMA, etc., the different channels on the forward and reverse links 50 and 52 may be defined by differing frequencies, time slots, and/or spreading codes.

In the illustration, the set of forward link channels 54 is consistent with cdma2000 standards and includes a Forward Common Pilot Channel (F-CPICH), a Forward Common Power Control Channel (F-CPCCH), a Forward Quick Paging Channel (F-QPCH), a Forward Paging Channel (F-PCH), a Forward Synchronization Channel (F-SYNCH), a Forward Common Access Channel (F-CACH), Forward Fundamental Channels (F-FCH), and Forward Supplemental Channels (F-SCH). This enumeration of channels is not exhaustive or limiting, but merely representative of the typical forward link channels used in cdma2000. Similarly, the set of reverse link channels 55 includes Reverse Pilot Channels (R-PICH), Reverse Dedicated Traffic Channels (R-DTCH), and others. Again, this listing of reverse link channels is not exhaustive or exclusive.

Irrespective of the particular channel sets defined by network 10, a common approach to traffic and control signaling uses one or more "traffic" channels, such as the F-FCH listed above, to carry communication traffic to and from the mobile stations 14. Such traffic channels are supported by a number of associated channels, including associated control channels that are generally referred to herein as messaging channels. In broader terms, one or more "signals of interest" convey communication traffic, with such operation supported by one or more messaging channels carrying control and signaling information. In accordance with the present invention, the noise may be estimated for signal of interest based on obtaining noise values for the estimation from one or more messaging channel signals associated with the signal of interest. These associated signals are sampled at times coincident with the points in time for which the noise of the signal of interest is to be estimated.

Figure 3:
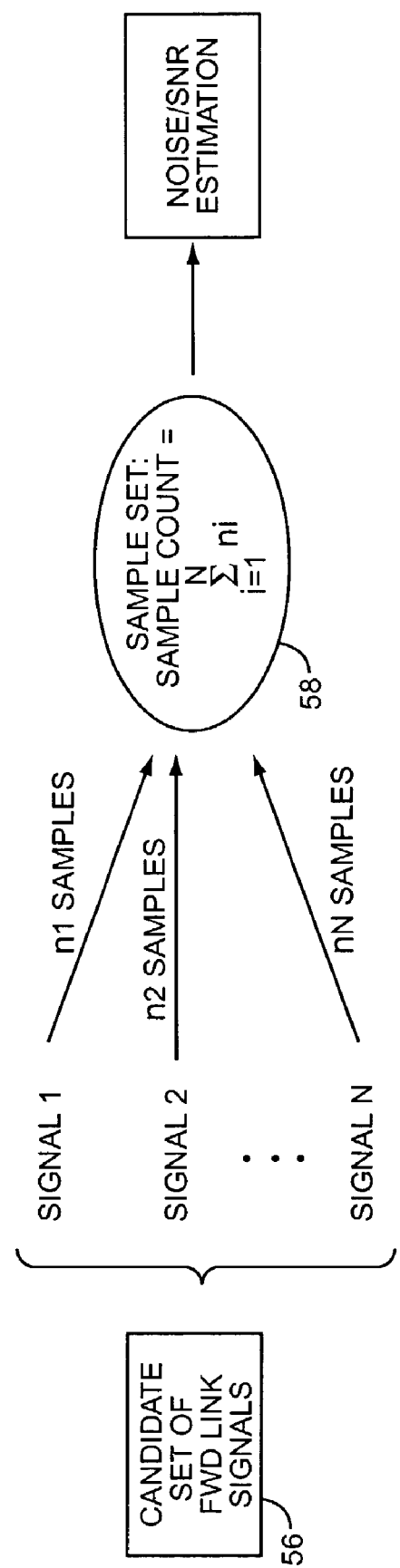
FIG. 3 is a generalized diagram of an exemplary embodiment of the present invention.

FIG. 3 illustrates a generalized, exemplary embodiment of the present invention. Mobile station 14 determines or is otherwise programmed with a set of "candidate signals" 56. The candidate signals are in the available set of forward link signals associated with the set of forward link channels 54, and are associated with a signal of interest. The mobile station 14 selects one or more of the candidate signals 56 for use in estimating the received noise in the signal of interest, e.g., SIGNAL1, SIGNAL2, ..., SIGNALN. Mobile station 14 obtains $n_i$ samples from each ith selected signal, i.e., n1 samples from SIGNAL1, n2 samples from SIGNAL2, and so on. In this manner, the number M of noise value samples in the noise value sample set 58 obtained by mobile station 14 over the given noise estimation interval is some multiple of the number of selected signals. Where an equal number n of samples is obtained from N selected signals, M=N*n.

Figure 4:
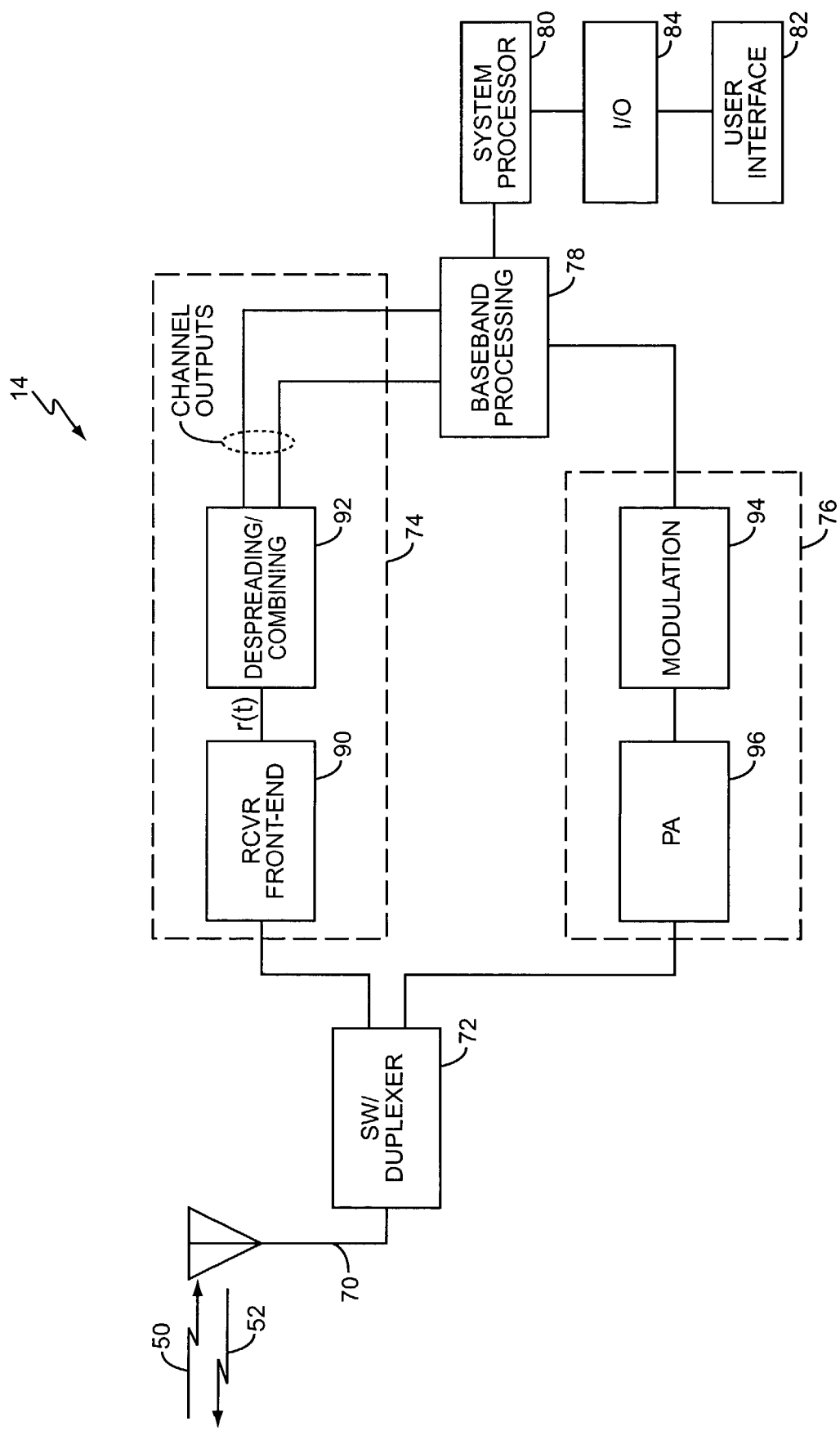
FIG. 4 is a diagram of an exemplary mobile station for practicing the present invention.

FIG. 4 provides exemplary details for implementing the above general functionality within mobile station 14. In this embodiment, the mobile station 14 comprises a transmit/receive antenna 70, a switch/duplexer 72, a receiver 74, a transmitter 76, a baseband processor 78, and a system processor 80 coupled to a user interface 82 via input/output (I/O) circuits 84.

The exemplary receiver 74 comprises a receiver front-end 90 and despreading/combining circuits 92, which provide a set of despread channel outputs to the baseband processor 78. Thus, in at least one exemplary embodiment of the present invention, the receiver 74 and the baseband processor 78 cooperatively perform the inventive noise estimation and closed-loop power control operations described herein. Indeed, selected receiver and baseband processing functions may be integrated into one or more combined microprocessors and related software, ASICs, or some combination thereof.

In any case, it should be understood that, in CDMA implementations, front-end 90 preferably provides digitized sample streams representing discrete sample values of the received waveform. In turn, despreader/combiner 92 despreads the individual Walsh code channels to obtain the various forward link channel signals, e.g., CPICH, CPCCH, FCH, etc. As such, despreader/combiner 92 preferably includes a plurality of RAKE receiver "fingers," which may be used for diversity combining gain with respect to the digitized sample stream r(t). Ultimately, despreader/combiner 92 outputs a plurality of samples from the various forward link channel signals comprising r(t), and provides these signals as an input set for processing by baseband processor 78. Thus, as regards noise estimation operations, baseband processor 78 preferably selects desired ones of the input channel signals for use in noise estimation, and subsequent closed-loop power control of the forward link based on that noise estimation.

As the baseband processor 78 determines the required power control commands (up or down), it transmits these commands back to the network 10 at up to 800 Hz, typically by including the commands as Power Control Bits (PCBs) carried in the mobile station's reverse link traffic signal. In support of such transmissions, the transmitter 76 generally comprises a modulator 94 and a power amplifier circuit 96. In an exemplary embodiment, the modulator 94 comprises a digital modulation circuit 94 responsive to baseband data, including the PCBs used for closed-loop forward link power control, from the baseband processor 78. Thus, the modulated output from modulator 94 drives the RF input of power amplifier circuit 96, which provides an RF output signal, e.g., a transmit signal, responsive to that input and that is suitable for transmission to the network 10 via antenna 70.

Figure 5:
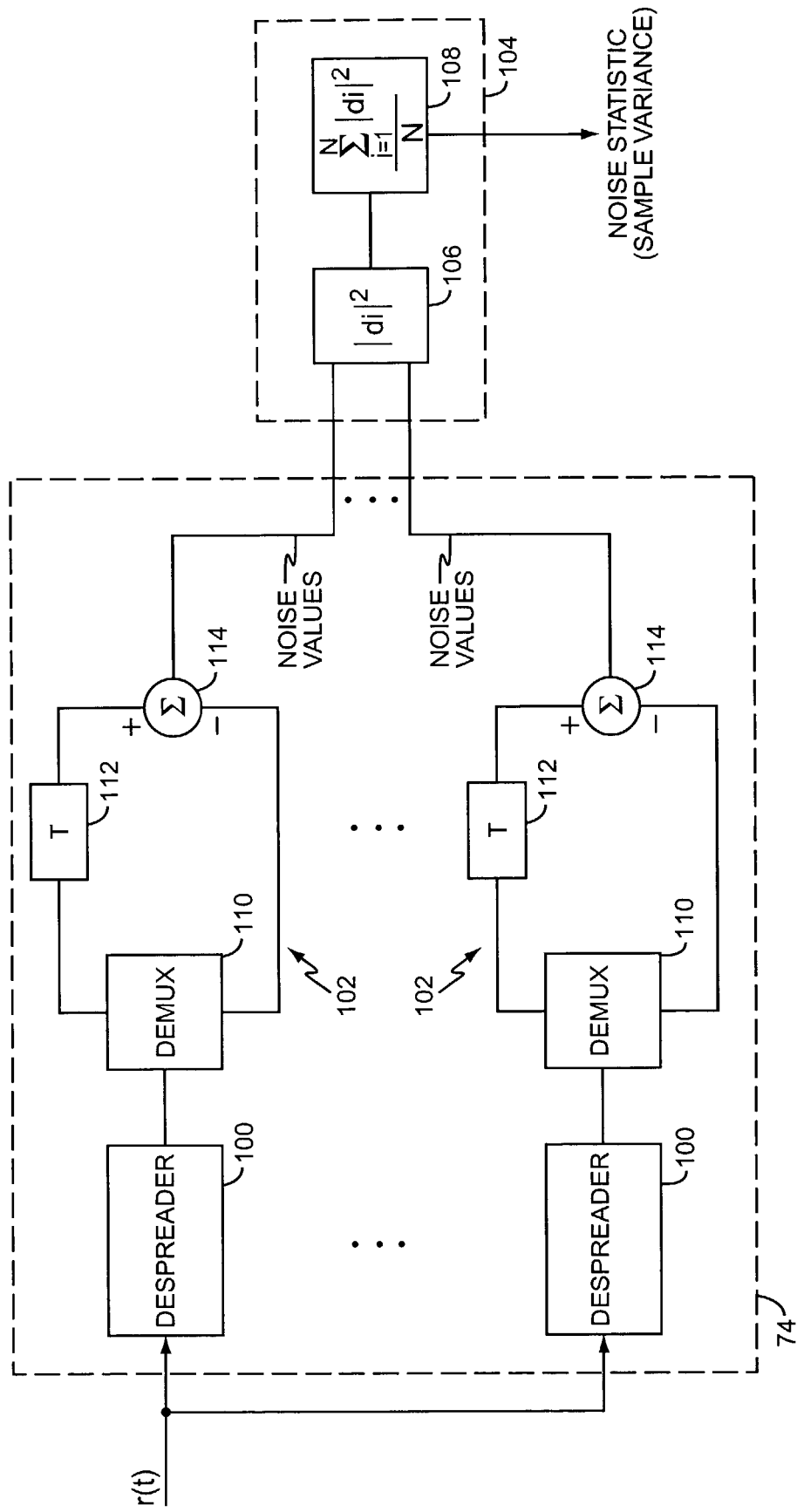
FIG. 5 is a diagram of exemplary details for the mobile station of FIG. 4.

With the above framework in mind, FIG. 5 illustrates exemplary details for receiver 74 and supporting processing logic that is preferably implemented in baseband processor 78. As illustrated, the despreader/combiner 92 of receiver 74 includes a receive processing path for the code channel signals comprising r(t) as output by the front-end 90 of receiver 74. Each processing path includes a despreader 100 and a noise sampler circuit 102. Noise sampler circuit, in this exemplary embodiment, comprises a demultiplexer 110, a delay element 112, and a summer 114. In operation, the noise sampler circuit 102 receives successive symbol values from the corresponding code channel provided by despreader 100, and generates successive noise values based on subtracting like signal sample pairs.

More particularly, where the code channel signal includes repeated symbol values, demultiplexer 110 outputs a given symbol from time n on each of its two outputs. One of these outputs feeds summer 114, while the other feeds delay element 112, which in turn feeds summer 114. Thus, summer 114 is presented with symbol values from time n and time (n−1). Where the symbol at time n represents a repeated value of the symbol obtained at time n, summer 114 effectively subtracts like symbol values such that its output represents noise values from which deterministic signal components are cancelled. In like fashion, each code channel used for noise estimation is similarly processed, such that one or more sets of such noise values are fed into noise estimation circuit 104 over the current noise estimation interval.

In an exemplary embodiment, noise estimation circuit includes a squaring element 106, and a statistical estimation element 108. Thus, exemplary estimation of the noise statistic is based on the noise estimation circuit 104 squaring each of the noise values output by the collection of noise sampler circuits 102, and then summing these squared values and, finally, dividing the sum of the squares by the sample set size N. As noted earlier, N=M×n, where M equals the number of code channels used for noise estimation, and n equals the number of samples taken from each code channel. One should note that the same number of samples may not, in practice, be obtained across all of the code channels used for noise estimation.

In better understanding the above details, it may be helpful to look at exemplary signal and timing details in the context of the cdma2000 standards. Certain "radio configurations" in cdma2000, i.e., Radio Configurations 3 and above, e.g., RC3, RC4, etc., provide for fast forward link power control. Unlike the previous generation of IS-95 CDMA networks, which provided 50 Hz forward link power control, networks based on cdma200 standards offer forward link power control at rates up to 800 Hz. Such fast forward power control allows cdma2000 networks to maintain low cross channel interface even in the presence of dynamic fading.

Figure 6:
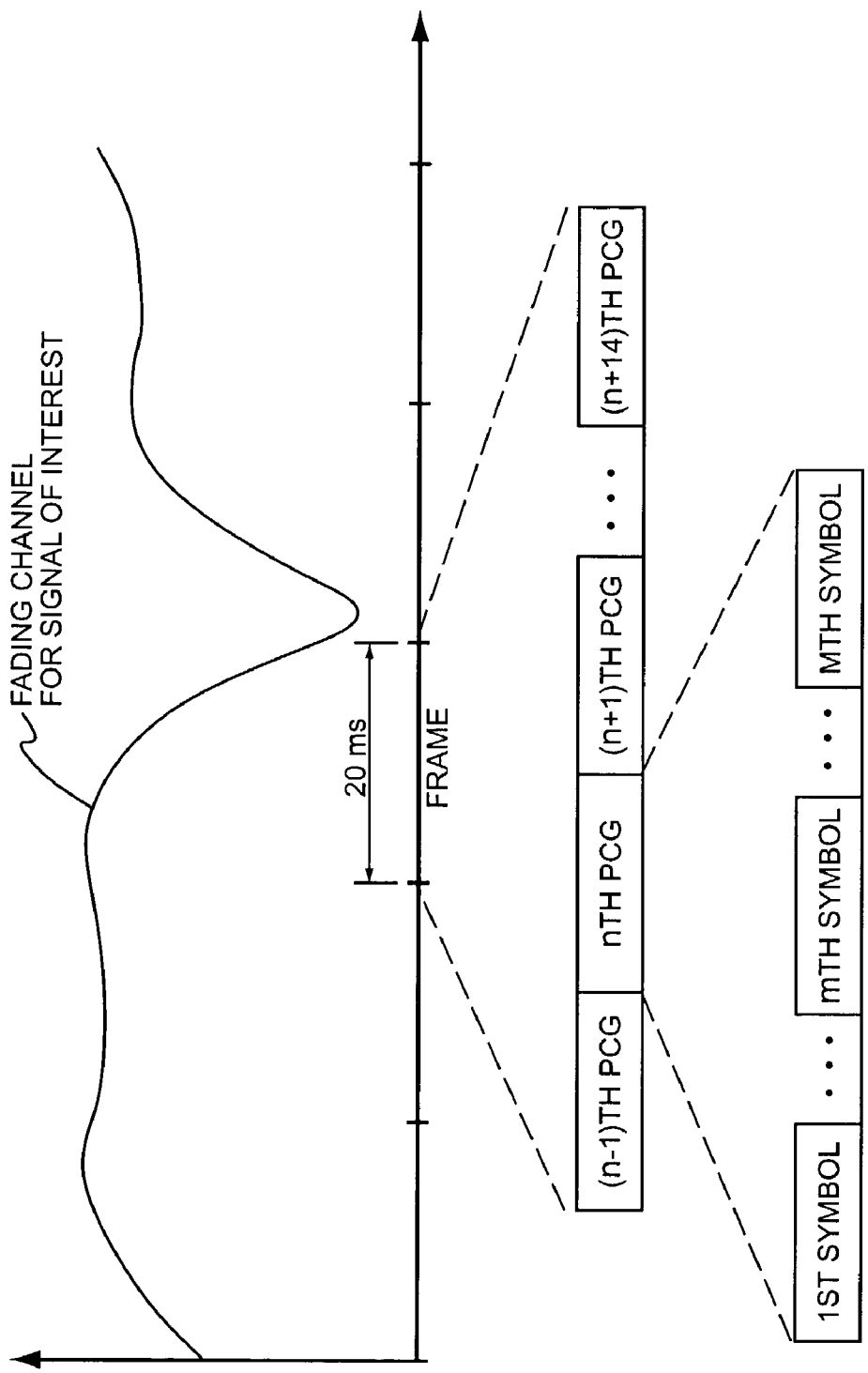
FIG. 6 is a diagram of typical signal fading relative to Power Control Group timing.

FIG. 6 illustrates a typical fading channel profile for the signal of interest, demonstrating that the received signal level of the signal of interest—as well as the forward link signals—may vary substantially with dynamic fading. That is, as the radio propagation channel between RAN 12 and mobile station 14 changes, so too do the received signal characteristics at the mobile station 14. FIG. 6 further illustrates a 20 millisecond frame as defined by cdma2000 standards relative to the typical fading channel profile. The network 10 uses 16 Power Control Groups (PCGs) per frame to transmit power control symbols to the various mobile stations 14 for forward link power control. As evident from the illustration, channel fading may vary significantly over even one frame. Such potential variation in fading effects is but one factor complicating accurate SNR calculation.

From the illustration, one notes that each frame comprises a plurality of PCGs. Thus, for example, a 20 millisecond frame comprises sixteen PCGs transmitted by the network 10 to mobile stations 14, with each PCG spanning a 1.25 millisecond interval (16×1.25 ms=20 ms). In turn, each PCG is punctured by a plurality of power control symbols providing the power control command to a mobile station 14.

Power control symbols within a given PCG are transmitted at the full rate power relative to the corresponding mobile stations 14. Therefore, even where the mth mobile station 14 is operating at less than the full frame rate, e.g., operating at ½, ¼ or ⅛ frame rates, that mobile station 14 receives at least one power control symbol every 1.25 ms at the current full rate forward link transmit power assigned to the mobile station 14. Since frame rates cannot be resolved until the entire frame is received and decoded, the power ambiguity associated the unknown rate makes traffic symbols unusable for SNR estimation at the PCG level. Thus, the power control symbols for a given mobile station 14 are received at the signal strength corresponding to full-rate transmit power and therefore provide a basis for SNR determination and subsequent forward link power control regardless of whether the mobile station 14 is actually operating at the full frame rate.

The mobile station 14 uses the pilot signal it receives on the F-CPICH for several functions, including signal-to-noise ratio (SNR) estimation operations according to at least some embodiments of the present invention. The pilot signal also is used for pseudo-noise (PN) long code acquisition and cell identification, channel amplitude and phase estimation, i.e., forward link propagation channel coefficient determination, RAKE combining operations, and handoff operations. Assuming that code acquisition is completed and that the chip timing of the pilot signal is accurate, the mth pilot symbol obtained on the F-CPICH signal, m∈{1, . . . , M}, in the nth PCG is expressed as, $$r_l^{(P)}(n,m) = h_l(n,m)\sqrt{E^{(P)}} + n_l^{(P)}(n,m) \tag{1}$$

where the subscript l, l∈{1, . . . , L} indexes the RAKE finger, and the superscript $^{(P)}$ indicates the F-CPICH. The constant $E^{(P)}$ accounts for the fixed transmitted F-CPICH energy. The complex multipath channel coefficient and the complex noise for the lth propagation path are denoted by $h_l(n,m)$ and $n_l^{(P)}$, respectively.

In the mobile station receiver 74, the despread F-CPICH symbols are passed through a filter to obtain smoothed pilots as the channel estimates for the propagation paths, with such estimates denoted as $\tilde{r}_l^{(P)}(n,m)$. Assuming the smoothing error is negligible, we can express $\tilde{r}_l^{(P)}(n,m)$ as, $$\tilde{r}_l^{(P)}(n,m) = r_l^{(P)}(n,m) - n_l^{(P)}(n,m) \tag{2}$$
$$\approx h_l^{(P)}(n,m)\sqrt{E^{(P)}}$$

The smoothed pilots are used for combining the multipath RAKE fingers' output in despreader/combiner 92 to achieve diversity gain.

With conventional approaches to SNR estimation, a mobile station might accumulate sample values for the signal of interest over a defined noise estimation interval and then sum or otherwise combine the samples to obtain a noise statistic presumably representative of the received noise in the signal of interest. This noise statistic was then used in the SNR estimation with the signal strength being determined from the corresponding punctured PCG symbols as described above. However, fading effects over the noise estimation interval oftentimes compromise the accuracy of such an approach because the different sample values reflect changing signal fading effects. That is, with such an approach the value of the noise estimate for the noise estimate interval depends not only on the actual noise in the received signal but also on the change in channel fading across the interval.

Similar to IS-95 systems, the cdma200 F-FCH is punctured by the Power Control Subchannel. Depending on the radio configuration, each power control bit is repeated a certain number of times to form QPSK channel symbols. The position of the puncturing power control symbols is determined by the scrambling sequence from the previous PCG. From the previous PCG, the last 3 or 4 bits of the scrambling sequence are taken with reversed order, as listed in the last column of Table 1, shown immediately below, to decide the position of power control symbols in the current PCG.

TABLE 1

Parameters of Power Control Subchannel Puncturing (Single-Carrier Mode)

| Radio Configuration | Number of Power Control Bit Repetition | Power Control Bit Energy | Starting Symbol Positions | Decimated Bits† (MSB → LSB) |
|---|---|---|---|---|
| 1 | 2 | $E_b$ | 0, 1, . . ., 15 | 23, 22, 21, 20 |
| 2 | 1 | $3E_b/4$ | 0, 1, . . ., 15 | 23, 22, 21, 20 |
| 3 (non-OTD) | 4 | $E_b$ | 0, 2, . . ., 30 | 47, 46, 45, 44 |
| 3 (OTD) | 4 | $E_b$ | 0, 4, . . ., 28 | 47, 46, 45 |
| 4 | 2 | $E_b$ | 0, 2, . . ., 14 | 23, 22, 21 |
| 5 (non-OTD) | 4 | $E_b$ | 0, 2, . . ., 30 | 47, 46, 45, 44 |
| 5 (OTD) | 4 | $E_b$ | 0, 4, . . ., 28 | 46, 46, 45 |

Note:
$E_b$ is the energy per full-rate bit of the F-FCH.
†"Decimated bits" means the indices of binary srambling bits in the previous PCG converted to the decimal format as the positions of Power Control Subchannel puncturing.

As an example, RC4 uses the last 3 scrambling bits (011) from the previous PCG, reverses their order (110), and punctures the power control bit at an index of 12 ('110'=12 in binary form). The power control bit repeats twice and replaces traffic bits of indices 12 and 13. Because of QPSK modulation, the two power control bits take one channel symbol of 128 chips. The parameters of Power Control Subchannel puncturing are given above in Table 1 for single carrier mode (1×RTT).

The received power control symbol is denoted by $$r_l^{(C)}(n,m') = h_l(n,m')\sqrt{E^{(C)}(n)}d(n) + n_l^{(C)}(n,m') \quad (3)$$

where the superscript $^{(C)}$ indicates the Power Control Subchannel and the index m' represents the position of the power control symbol. Depending on the radio configuration, m' can be a single value $m_n^{(C)}$, which varies from PCG to PCG, or two consecutive values $m' \in \{m_n^{(C)}, m_n^{(C)}+1\}$. The nth PCG power control bit and its transmitted energy are denoted by $$d(n) \in \left\{\frac{1+i}{\sqrt{2}}, \frac{-1-i}{\sqrt{2}}\right\},$$

and $E^{(C)}(n)$, respectively. Note that the transmitted symbol energy in the Power Control Subchannel is not a constant as it is in the F-CPICH. Each $E^{(C)}(n)$ is adjusted according to the power control command sent earlier by the mobile station.

To compensate for the phase of multipath channel coefficient, each RAKE finger in receiver 74 is multiplied by the complex conjugate of the corresponding smoothed pilot, i.e., ideally $$y_l^{(C)}(n,m) = [\tilde{r}_l^{(P)}(n,m')]^* r_l^{(C)}(n,m') \quad (4)$$

$$= |h_l(n,m')|^2 \sqrt{E^{(C)}(n)E^{(P)}}\, d(n) +$$

$$h_l^*(n,m')\sqrt{E^{(P)}}\, n_l^{(C)}(n,m')$$

Then, the RAKE fingers are combined to exploit the multipath diversity. Such operations are referred to as "pilot weighted combining," which is done in practice due to limited mobile receiver complexity. The statistic of the power control bit after pilot weighted combining is expressed as, $$z^{(C)}(n,m') = \sum_{l=1}^{L} y_l^{(C)}(n,m') \quad (5)$$

$$= \sqrt{E^{(C)}(n)\overset{(P)}{\Sigma}}\, d(n) \sum_{l=1}^{L} |h_l(n,m')|^2 +$$

$$\sum_{l=1}^{L} h_l^*(n,m')\sqrt{E^{(P)}}\, n_l^{(C)}(n,m')$$

With the mean and variance of the statistic given as, $$E\{z^{(C)}(n,m') \mid d(n)\} = d(n)\sqrt{E^{(C)}(n)E^{(P)}} \sum_{l=1}^{L} |h_l(n,m')|^2 \quad (6)$$

$$\text{var}\{z^{(C)}(n,m') \mid d(n)\} = \sum_{l=1}^{L} E^{(P)}|h_l(n,m')|^2 \text{var}\{n_l^{(C)}(n,m')\} \quad (7)$$

Similar to those of power control symbols, each F-FCH data symbol output by the corresponding RAKE fingers in receiver 74 are processed by pilot weighted combining. Therefore, after combining RAKE fingers of each F-FCH data symbol, the F-FCH noise variance is $$\sum_{l=1}^{L} E^{(P)} |h_l(n,m)|^2 \text{var}\{n_l^{(F)}(n,m)\} \quad (8)$$

where the superscript $^{(F)}$ denotes the F-FCH. One feature of the cdma2000 forward link is that the matched filter (MF) outputs of all code channels despread and output by receiver 74 share the same noise variance statistics. Therefore, the sample variance of noise can be obtained from other code channels if their signal component is easy to cancel. That is, the noise for the F-FCH signal (i.e., the signal of interest) may be determined using selected ones of the other forward link channel signals, since those other signals are transmitted simultaneously with the signal of interest, and the noise samples are related to the same time instants across all channels.

To summarize, estimating the signal-to-noise ratio of cdma200 F-FCH is equivalent to calculating the following quantities:

$$E_b(n, m) = |E\{z^{(C)}(n, m') | d(n)\}|^2 \quad (9)$$

$$= \left(\sqrt{E^{(C)}(n)E^{(P)}} \sum_{l=1}^{L} |h_l(n, m)|^2\right)$$

$$= E^{(C)}(n)E^{(P)}\left(\sum_{l=1}^{L} |h_l(n, m)|^2\right)$$

and $$N_t(n, m) = \sum_{l=1}^{L} E^{(P)}|h_l(n, m)|^2 \text{var}\{n_l^{(F)}(n, m)\} \quad (10)$$

Note that, for a cdma2000 forward link, MF outputs from receiver 74 of all Walsh code channels share the same noise characteristics. If the non-orthogonality interference (e.g., caused by multipath fading) can be modeled as white Gaussian, the noise components of different Walsh code MF outputs are i.i.d. random variables. Therefore, the estimation of $N_t$ can be achieved by selecting and processing one or more forward channels the deterministic (i.e., non-noise) signal components are relatively easy to remove.

An immediate example of such a signal is the pilot channel signal, where the MF outputs of any two adjacent symbols share the same signal component. However, the pilot channel signal offers too few signal samples across a given PCG for accurate estimation of the noise statistic. Processing according to the present invention obtains noise values from one or more modulated signals over the noise estimation interval to provide a suitable number of noise values for statistical estimation of the noise in the signal of interest.

From Eq.'s (9) and (10), we can divide the estimation of F-FCH $E_b/N_t$ into three parts:

1. Estimation of $h_l(n,m)\sqrt{E^{(P)}}$
2. Estimation of var $\{n_l^{(C)}(n,m)\}$
3. Estimation of $E^{(C)}(n)$ The following details illustrate exemplary implementations for generating these estimations.

The estimation of $h_l(n,m)$ can be done in many ways. Practically, it is accomplished by filtering the MF output statistics for the F-CPICH signal output in receiver 74. One popular method used in the industry is the MMSE smoothing. The smoothed pilot corresponding to the mth symbol of the nth PCG is denoted by $\tilde{r}_l^{(P)}(n,m)$. Another method is a model-based approach that approximates the fading channel as a moving average or an auto-regressive process, and estimates the channel variation according to these models.

Assuming the smoothed pilot has a negligible noise component, channel distortion on the received PCB is removed by, $$R_l(n, m') = \frac{r_l^{(C)}(n, m')}{\tilde{r}_l^{(P)}(n, m')} \quad (11)$$

$$= \frac{h_l(n, m')\sqrt{E^{(C)}(n)}\, d(n) + n_l^{(C)}(n, m')}{h_l(n, m')\sqrt{E^{(P)}}}$$

$$= \sqrt{\frac{E^{(C)}(n)}{E^{(P)}}}\, d(n) + \frac{n_l^{(C)}(n, m')}{h_l(n, m')\sqrt{E^{(P)}}}$$

The last term of Eq. (11) implies that the noise component corresponding to small $|h_l(n,m')|$ is enhanced by the division of $\tilde{r}_l^{(P)}(n,m')$. This effect is mitigated by the pilot weight combining $R_l(n,m')$ in the final step of estimating $E^{(C)}(n)$.

The second processing step removes the power control bit modulation. Taking the absolute value of $R_l(n,m')$ is a known approach but such operation leads to a biased estimation at low SNR. The major drawback is the increasing bias in the estimated $E^{(C)}(n)$ as SNR decreases, since the noise component is included in the absolute value of $R_l(n,m')$. One simple remedy is to subtract the estimate of noise variance from the biased estimate of $E^{(C)}(n)$. However, since the noise component is non-coherently combined by adding $|R_l(n,m')|$, it becomes dominant if each $R_l(n,m')$ has a low SNR. Subtracting noise estimates may help remove the bias, but large random errors still remain.

A more effective way of filtering the noisy $R_l(n,m')$ is to remove the data symbol modulation $d(n)$ in Eq. (11) and coherently combine $R_l(n,m')$ from multiple PCG's received by the mobile station 14. The coherent combining reduces the noise variance in $E^{(C)}$ estimate by the number of PCG's used. Decision feedback may be used to remove the power control bit modulation. The power control bit is detected based on, $$\hat{b}(n) = \text{sign}\left(\text{Re}\left\{\sum_{m'}\sum_{l=1}^{L} [\tilde{r}_l^{(P)}(n, m')]^* r_l^{(C)}(n, m')\right\} + \text{Im}\left\{\sum_{m'}\sum_{l=1}^{L} [\tilde{r}_l^{(P)}(n, m')]^* r_l^{(C)}(n, m')\right\}\right) \quad (12)$$

After the detection in (6), one may multiply $R_l(n,m')$ using the complex conjugate of the power control symbol based on $\hat{b}(n)$ and get the unsigned, average power ratio of Power Control Subchannel to F-CPICH as, $$\bar{R}_l(n) = \quad (13)$$

$$\begin{cases} \frac{\hat{b}(n)}{2}[R_l(n, m_n^{(C)}) + R_l(n, m_n^{(C)} + 1)], & \text{for } RC1 \\ \hat{b}(n)R_l(n, m_n^{(C)}), & \text{for } RC2 \\ \frac{\hat{b}(n) - j\hat{b}(n)}{2\sqrt{2}}[R_l(n, m_n^{(C)}) + R_l(n, m_n^{(C)} + 1)], & \text{for } RC3 \text{ and } RC5 \\ \frac{\hat{b}(n) - j\hat{b}(n)}{\sqrt{2}} R_l(n, m_n^{(C)}), & \text{for } RC4 \end{cases}$$

If decision feedback errors increase due to low SNR, the estimated signal component will be smaller since the ratios $R_l(n)$ from different PCG's may cancel each other by coherent combining. Fortunately, this should most happen when the F-FCH is below the target. In such cases, the SNR should be estimated low to send an "up" power control command. The effect decision feedback scheme in low SNR is less than expected, since the decision error does not necessarily translates to power control command error.

Since there are only two power control symbols in each PCG, filtering or averaging over those from other PCG's must be applied to reduce the noise variance. However, there are two differences between the current PCG and the others: multipath channel coefficients and transmit power level. The first difference, multipath channel coefficients, is cancelled by the division of the smoothed pilots in Eq. (11). Thus, the third step of estimating $E^{(c)}(n)$ is to equalize the power level of other PCG's. The transmit power of any previous PCG's is controlled by the MS's up-down commands, which can be assumed known to the MS. If there is no power control bit error on the reverse link, we can equalize the transmit power level of the past jth PCG by $\overline{R}_l(n-j)w(n,j)$, where $w(n,j)$ is the ratio of the transmit power level of current PCG to that of the (n–j)th PCG. Finally, one applies an average over the past J PCG's as, $$\hat{R}_l(n) = \frac{1}{J}\sum_{j=0}^{J-1} \overline{R}_l(n-j)w(n,j) \qquad (14)$$

$$\hat{E}_b(n) = \frac{1}{M}\sum_{m=1}^{M}\left|\sum_{l=1}^{L}\hat{R}_l(n)\hat{r}_l^{(P)}(n,m)\right|^2 \qquad (15)$$

$$= \hat{E}^{(C)}(n)E^{(P)} \cdot \frac{1}{M}\sum_{m=1}^{M}\left(\sum_{l=1}^{L}|h_l(n,m)|^2\right)$$

Generally, if there is no power control bit error on the reverse link, a larger number of PCG's in (15) will give less estimation errors. However, if a bit error occurs on the reverse link, the actual transmitted power on the forward link will differ than that assumed by the mobile station 14 based on its tracking of the previously transmitted PCBs. That is, the actual forward link transmit power differs from that expected by the mobile station 14 based on its prior transmitted power control commands. Depending on the timing of the bit error, the error can propagate through many symbols in the moving average of (15). Therefore, the number of J in (14) should be chosen with the possibility of such errors in mind, and estimation schemes with infinite memory, such as auto-regressive filtering preferably are not used to avoid accumulating such propagating errors.

For asynchronous spread-spectrum systems, the estimation of MF output noise variance can be easily achieved by using the off-correlation-peak samples because they have the same statistical property as the on-peak samples. The noise covariance can be obtained symbol by symbol with very good accuracy. In contrast, for the synchronized and Walsh code multiplexed cdma2000 forward link, the matched filter of one code channel keeps orthogonality with other channels only at the sample instant when its time response is aligned with the forward link symbol duration. The noise statistics is unique at the instant during which orthogonality holds. This creates a constraint on estimating $N_t$, which is that the noise samples must be taken at correlation peaks of the MF output of receiver 74. Furthermore, at those correlation peaks, the noise samples at different code channel MF outputs are i.i.d. random variables, provided the inter-path and other-cell interference can be characterized as AWGN after dispreading.

Ideally, if the mobile station 14 knows which Walsh codes are assigned in the forward link, such knowledge may be used to select the Walsh code channels to use for generating the i.i.d. noise samples used for estimating $N_t$. In reality, such knowledge is not available in the mobile station 14. Nevertheless, certain code channels in the forward link, i.e., selected ones of the forward link channel signal set 54 have deterministic signal components that can be easily cancelled, and the present invention exploits this characteristic.

In one or more conventional approaches, the estimation of $N_t$ is based on the unmodulated pilot channel. Assuming that the channel is virtually unchanged between two adjacent symbols, one can approximate the doubled noise component by $$r_l^{(P)}(n,m) - r_l^{(P)}(n,m+1) = h_l^{(P)}(n,m)\sqrt{E^{(P)}} + n_l^{(P)}(n,m) - \qquad (16)$$

$$h_l^{(P)}(n,m+1)\sqrt{E^{(P)}} - n_l^{(P)}(n,m+1)$$

$$\approx n_l^{(P)}(n,m) - n_l^{(P)}(n,m+1)$$

The reason for taking the difference of two adjacent symbols to obtain noise samples is given as follows. In practice, the magnitude of the despread pilot symbol is rather large compared to the noise standard deviation. Minor channel variations causes large fluctuations in F-CPICH MF outputs and introduce non-negligible errors to the generic noise sample variance. At higher vehicular speeds, i.e., in a mobile environment, the coherence time of the fading channel can be less than 1.25 ms, resulting in a loss of correlation between F-CPICH samples at the beginning and the end of a PCG. While it is not always true that the F-CPICH symbols in the same PCG are coherent, generally the coherence between two adjacent symbol holds. Therefore, compared to generic sample covariance estimators, the following noise variance estimator provides more accurate and unbiased results:

$$\mu_l(n) = \frac{2}{M}\sum_{m=1}^{M/2}\{[\tilde{r}_l^{(P)}(n,2m)]^*r_l^{(P)}(n,2m) - \qquad (17)$$

$$[\tilde{r}_l^{(P)}(n,2m-1)]^*\hat{r}_l^{(P)}(n,2m-1)\}$$

$$\hat{N}_t(n) = \qquad (18)$$

$$\frac{1}{M/2-1}\sum_{m=1}^{M/2}\left|\sum_{l=1}^{L}\left\{\begin{matrix}[\tilde{r}_l^{(P)}(n,2m)]^*r_l^{(P)}(n,2m) - \\ [\tilde{r}_l^{(P)}(n,2m-1)]^*\hat{r}_l^{(P)}(n,2m-1)\end{matrix}\right\} - \mu_l(n)\right|^2$$

The subtraction between two adjacent symbols can also be applied to channels with symbol repetition. In cdma2000, there are several such channels, and we list them in Table 2 immediately below:

TABLE 2

Forward Code Channels with Symbol Repetition

| Channel Type (SR1) | Number of Repeated Code Symbols |
| --- | --- |
| Sync Channel | 2 |
| Quick Paging Channel | 2 (4800 bps), 4 (2400 bps) |

Paging Channel symbols, usually transmitted at 8% of the maximum RBS power, can be detected reliably. Hence decision feedback can be used to cancel the signal component, provided a good Paging channel power estimation is implemented or the Pilot-to-Paging power ratio is known. For RC3 and RC4 F-FCH, where length-64 Walsh codes are used, F-CACH and F-CPCCH (using length-128 Walsh code) can also be Viewed as channels with symbol repitition.

Figure 7:
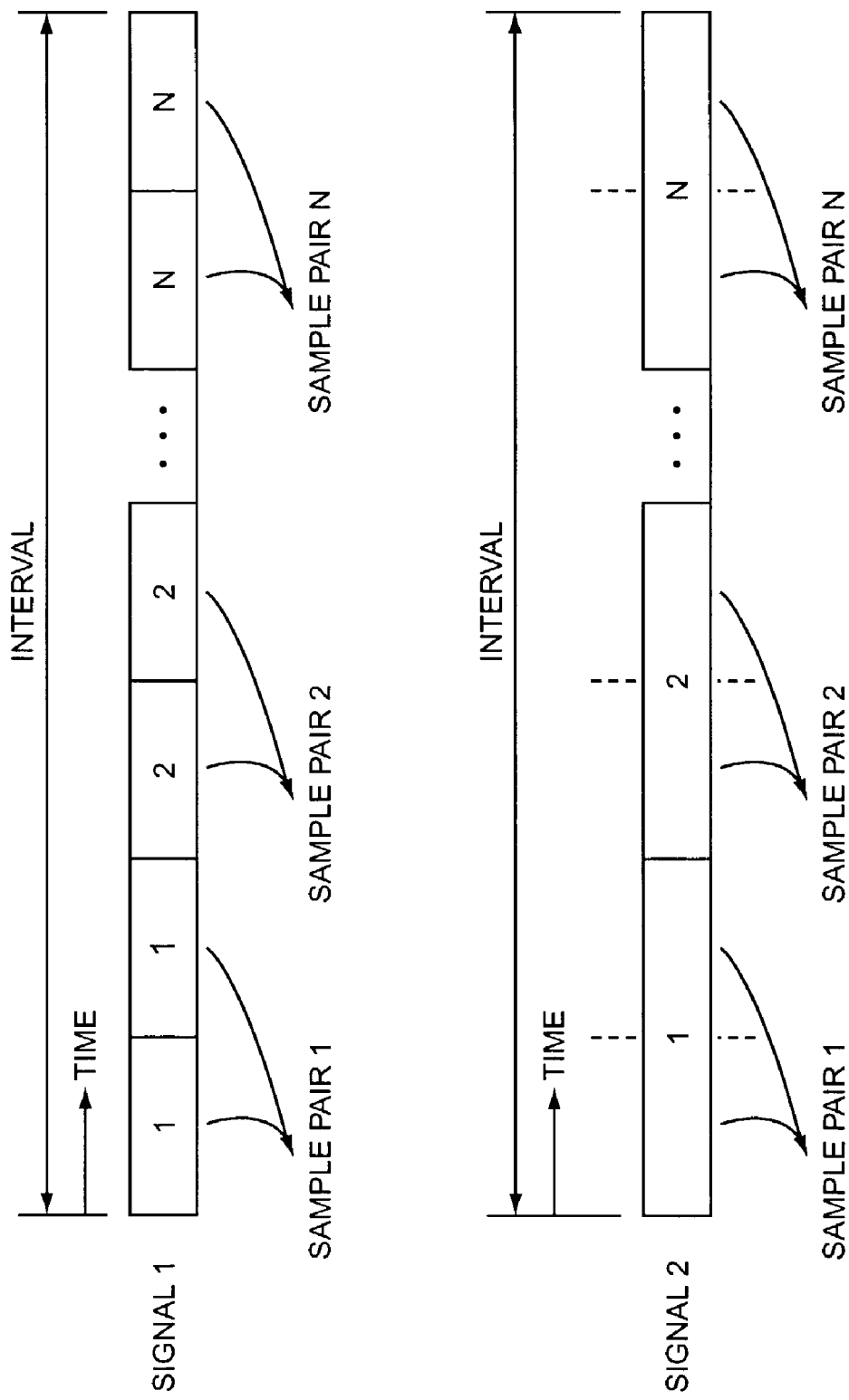
FIG. 7 is a diagram of two exemplary approaches to generating like valued sample pairs as used for noise estimation in the present invention.

FIG. 7 provides a simplified illustration of using adjacent symbols in modulated signals for noise estimation, and depicts two basic approaches to obtaining noise values for use in estimation of the noise statistic. SIGNAL1 represents a given one of the messaging channel signals received in association with the F-FCH signal of interest, and is depicted as having the same symbol timing, i.e, the same spreading gain as the signal of interest. Moreover, SIGNAL1 includes repeating pairs of symbols, i.e., SYMBOL1, SYMBOL1, SYMBOL2, SYMBOL2, . . . , SYMBOLN, SYMBOLN. Thus, to obtain a noise sample, mobile station 14 need only sample adjacent, like symbol values to form like valued pairs of signal samples, and then subtract the sample values in each pair. Such subtraction cancels or otherwise removes the deterministic signal components, leaving the desired noise sample. Such operation is consistent with the exemplary noise sampler 102 illustrated in FIG. 5, which depicted an exemplary circuit for subtracting repeated symbol values.

Therefore, despite SIGNAL1 containing modulated data, the processing performed by mobile station 14 enables its use in noise estimation, which means that mobile station 14 has expanded the set of signals available to it for noise estimation, and hence expanded the potential number of noise samples available for estimating the noise statistic resulting in a more reliable SNR estimate.

SIGNAL2 exemplifies another opportunity for mobile station 14 to use modulated signals for noise estimation. Here, SIGNAL2 has a spreading gain that is twice the spreading gain of the signal of interest. Effectively, then, symbols received on SIGNAL2 have twice the symbol period of those received on the signal of interest. Thus, mobile station 14 can treat SIGNAL2 as having repeating symbol values by despreading each actual symbol as two repeated values. For example, assuming that SIGNAL2 has a spreading gain of 128 chips/symbol while the signal of interest has a spreading gain of 64 chips/symbol, despreader 100 may despread SIGNAL2 at 64 chips/symbol yields two "derived" symbols per every 128 chips. Mobile station 14 then subtracts each pair of derived symbols as like pairs of signal samples to obtain the desired non-deterministic noise values. Thus, the noise sampler 102 may operate on actual or derived like valued symbol pairs obtained on a corresponding one of the code channel signals in r(t).

Regardless, repeated symbols (or derived repeated symbols) offer the mobile station 14 an opportunity to obtain signal samples that contain identical deterministic signal components, and therefore easily cancel the data symbol component by subtracting the two adjacent output symbol samples from the MF outputs in receiver 74 corresponding to one or more of the code channels in Table 2. Including samples from these channels in the $N_t$ estimation can greatly reduce the variance obtained from (18). That is, increasing the number of samples in the set of noise values used to obtain the noise statistic results in an improved statistical performance as the sample variance more nearly approximates the true population variance with increasing sample size.

Figure 8:
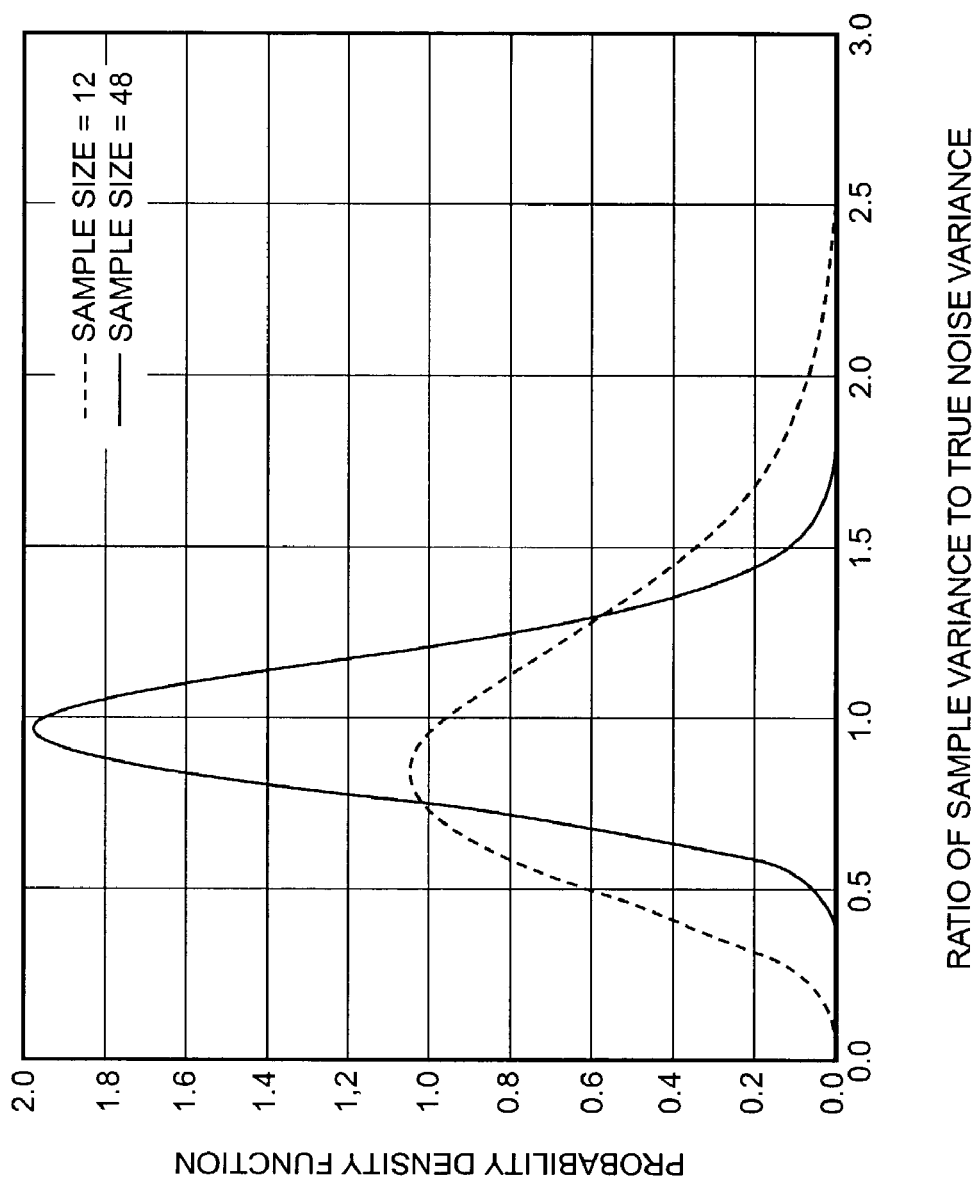
FIG. 8 is a diagram of exemplary noise estimation performance improvements associated with one embodiment of the present invention.

Letting the ratio of the sample variance in (18) to the true $N_t$ be p, FIG. 8 illustrates the probability density function (pdf) of p. The dashed-dot line represents the pdf of p obtained by only using F-CPICH for noise sampling, and the solid line represent the pdf of p obtained by using Pilot, Sync, Paging (4.8 kbps) and Quick Paging Channels for noise sampling in accordance with the present invention. As the order (sample set size) increases, the sample variance of (18) is distributed closer to the true $N_t$, i.e., p falls in a smaller neighborhood of 1.

In addition to using code channel signals that include actual or derivable repeated symbol values, the present invention provides additional exemplary approaches to obtaining noise samples from selected overhead channels.

For example, certain ones of the overhead channels may be received at a relatively high signal power, which enables reliable detection of the symbol values transmitted on those channels' signals. With such reliable symbol detection, decision feedback may be used to subtract detected symbols from delayed versions of the received symbols, which effectively yields the same-symbol subtraction operation available for code channels having explicit or derivable repeated symbols.

Referring to Table 2, the Paging Channel operated at 9.6 kps is a relatively high power signal that lends itself to a decision feedback approach to obtaining additional noise samples over the noise estimation interval. Thus, an exemplary decision feedback method can be used to cancel the deterministic data signal components from noise samples obtained from that channel's signal. Note that only the difference between adjacent modulation symbols needs to be determined, and the Paging Channel is one of the high-power channels that can be reliably detected in the coverage area.

Figure 9:
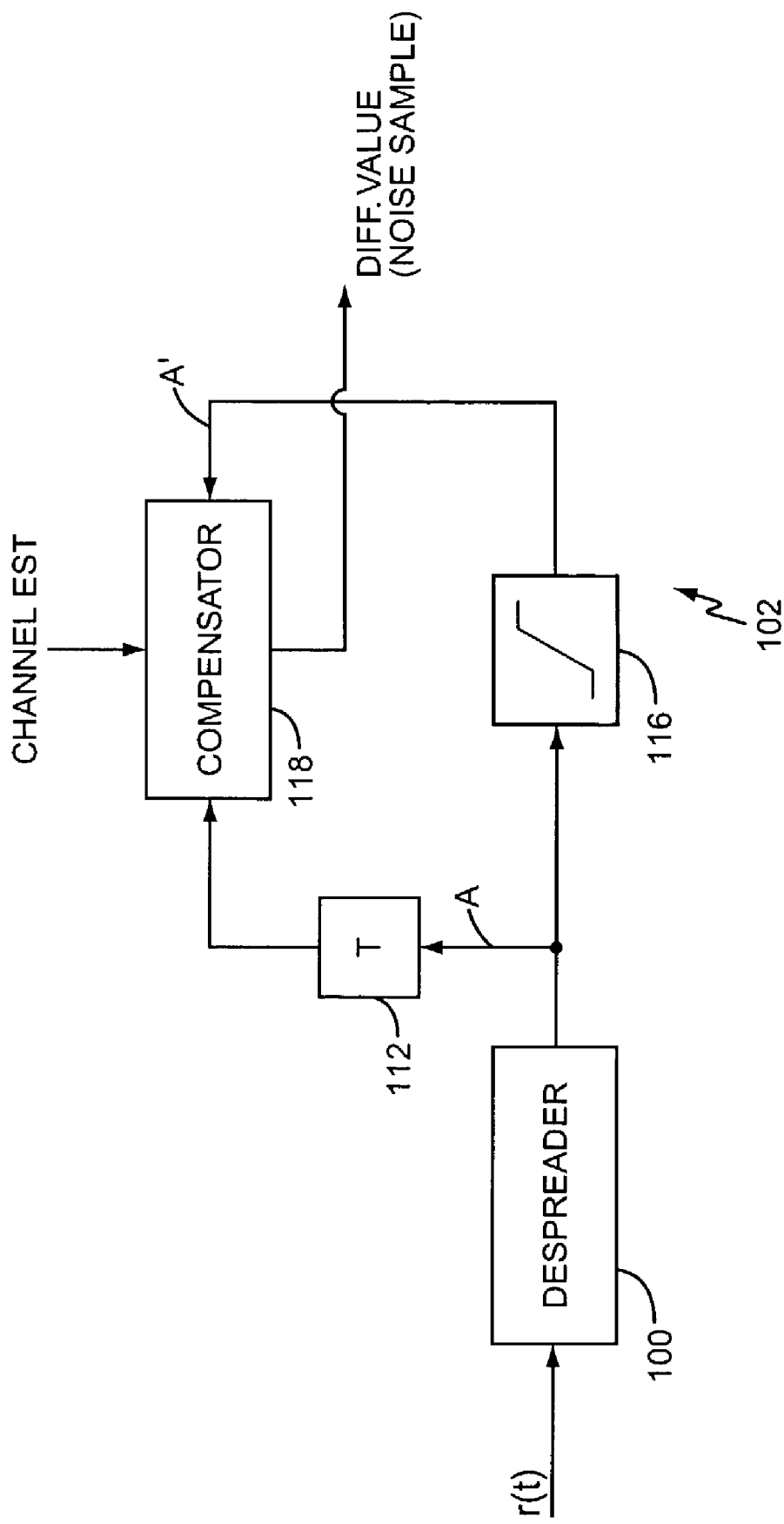
FIG. 9 is a diagram of exemplary details for the mobile station of FIG. 4 illustrating a decision feedback approach to generating like valued sample pairs as used for noise estimation in the present invention.

FIG. 9 depicts an exemplary embodiment of the noise sampling processing path first illustrated in FIG. 5 but adapted for the above decision feedback approach to noise sampling. Here, the noise sampling circuit 102 is modified to include a hard decision element 116 and a compensator 118, in addition to the delay element 112. It should be understood that the exemplary receiver 74 might include one or more noise sampling paths of the type illustrated in FIG. 5 in combination with one or more noise sampling paths of the type illustrated here. Moreover, with a digital implementation of noise sampling based on ASICs and/or microprocessors operating as baseband processor 78, mobile station 14 may simply reconfigure receiver 74 and its baseband processing to implement whatever noise sampling approaches are currently desired. Such mode switching may be keyed to the current radio configuration of mobile station 14, which, as noted earlier, bears on which code channels are candidates for use in noise estimation.

In any case, operation of the noise sampling circuit 102 in its decision feedback configuration is based on hard decision circuit 116 making "hard" symbol decisions for the "soft" decision values output by despreader 100. Thus, a given received symbol is detected as a soft value, say +0.6. This soft value is translated to a hard value of 1.0 by operation of hard decision circuit 116, with the underlying point of this operation to remove the "noise" from the soft value, leaving only the hard, deterministic signal component of the transmitted symbol. The hard value is then fed into compensator 118, which also receives the corresponding soft value from despreader 100, as delayed for time alignment by delay element 112.

Compensator 118 further receives channel estimate information corresponding to the sample time of the soft value being operated on by it. Such channel information may be calculated according to a number of techniques, all of which are well known in the art. Compensator 118 uses the channel estimate information to "compensate" the hard decision value to conform it to the channel distortions imparted to the deterministic signal components in the corresponding soft value. In an exemplary embodiment, compensator 118 applies an amplitude compensation to the hard decision value such that its amplitude is returned to approximately the same level as the actual received symbol value such that subtracting the compensated hard value from the soft value leaves only the non-deterministic noise components, which represent the noise sample to be used for noise estimation.

Note that with decision feedback, there is no doubling of the noise component as occurs with subtraction of repeated symbol pairs, but operation of the noise estimation circuit 104 may be configured to properly compute the noise statistic with noise samples obtained by repeated symbol subtraction, by decision feedback subtraction, or a mix of both methods.

With one or both of the above approaches, mobile station 14 operating in accordance with the present invention can at least quadruple the number of noise samples available for noise estimation over a cdma2000 PCG interval. Similar advantages accrue in other network standards as well. Since the noise estimate in (18) is chi-square distributed, the gain of larger sample size can be evaluated quantitatively. If each noise sample has a unit variance, the standard deviation of (17) is $$\sqrt{\frac{4}{M}}.$$

Increasing M by four will reduced the standard deviation by 3 dB. As a result, the approach to SNR estimation outlined herein has much less error than conventional noise estimation approaches that use fewer noise samples.

Combining (15) and (18), one can easily estimate the SNR of the nth F-FCH frame by $$\text{Est. of } \frac{E_b}{N_t}(n) = \frac{\hat{E}_b(n)}{\hat{N}_t(n)} \quad (19)$$

Note that, if the channel estimation error and the reverse power control bit error are negligible, the ratio $\hat{R}_f(n,m')$ in (11) is Gaussian distributed and the bit-energy estimate $\hat{E}_b(n)$ in (15) non-central chi-square distributed. In addition, the noise variance estimate $\hat{N}_t(n)$ in (18) is a chi-square random variable. As a result, one concludes that the SNR estimation error is non-central F-distributed by Eq. (19).

In looking at the benefits of the present invention's improved noise estimation, one obvious advantage is improved forward link transmit power control. Tightening the closed-loop control accuracy of forward link transit power avoids unnecessary wasting of transmit power, which, considering that power potentially is saved with each active mobile station connection supported by a given RBS 62, increases the effective capacity of network 10 by more efficiently allocating the limited forward link transmit power available at each RBS 62.

In an exemplary operation, mobile station 14 receives, for example, communication traffic on a forward fundamental channel (F-FCH), and control or other signaling information on one or more of the messaging channels transmitted simultaneously with the traffic channel signal, i.e., with the F-FCH signal. For example, the mobile station 14 may receive a Common Pilot Channel (F-CPICH) signal, a Quick Paging Channel (F-QPCH) signal, a Paging Channel (F-PCH) signal, a Synchronization Channel (F-SYNCH) signal, a Common Power Control Channel (F-CPCCH) signal, and a Common Access Channel (F-CACH) signal in conjunction with the F-FCH signal.

In any case, the mobile station 14 typically operates with a minimum acceptable signal quality relative to the traffic channel signal such that errors in the data received in the traffic channel signal do not exceed a desired threshold, oftentimes specified as a Frame Error Rate (FER). The mobile station 14 uses closed-loop power control to maintain acceptable received signal quality, whereby it commands the supporting RAN 12 to increase its forward link transmit power within defined limits if the FER of the traffic channel signal becomes excessive. Further, if FER is lower than needed for acceptable signal quality, i.e., the traffic channel signal has a higher than needed received signal quality, the mobile station 14 may instruct the RAN 12 to decrease forward link transmit power. Such decreases avoid wasting the finite forward link transmit power available at the particular RBS(s) 62 transmitting to the mobile station 14 on the forward link 50.

Figure 10:
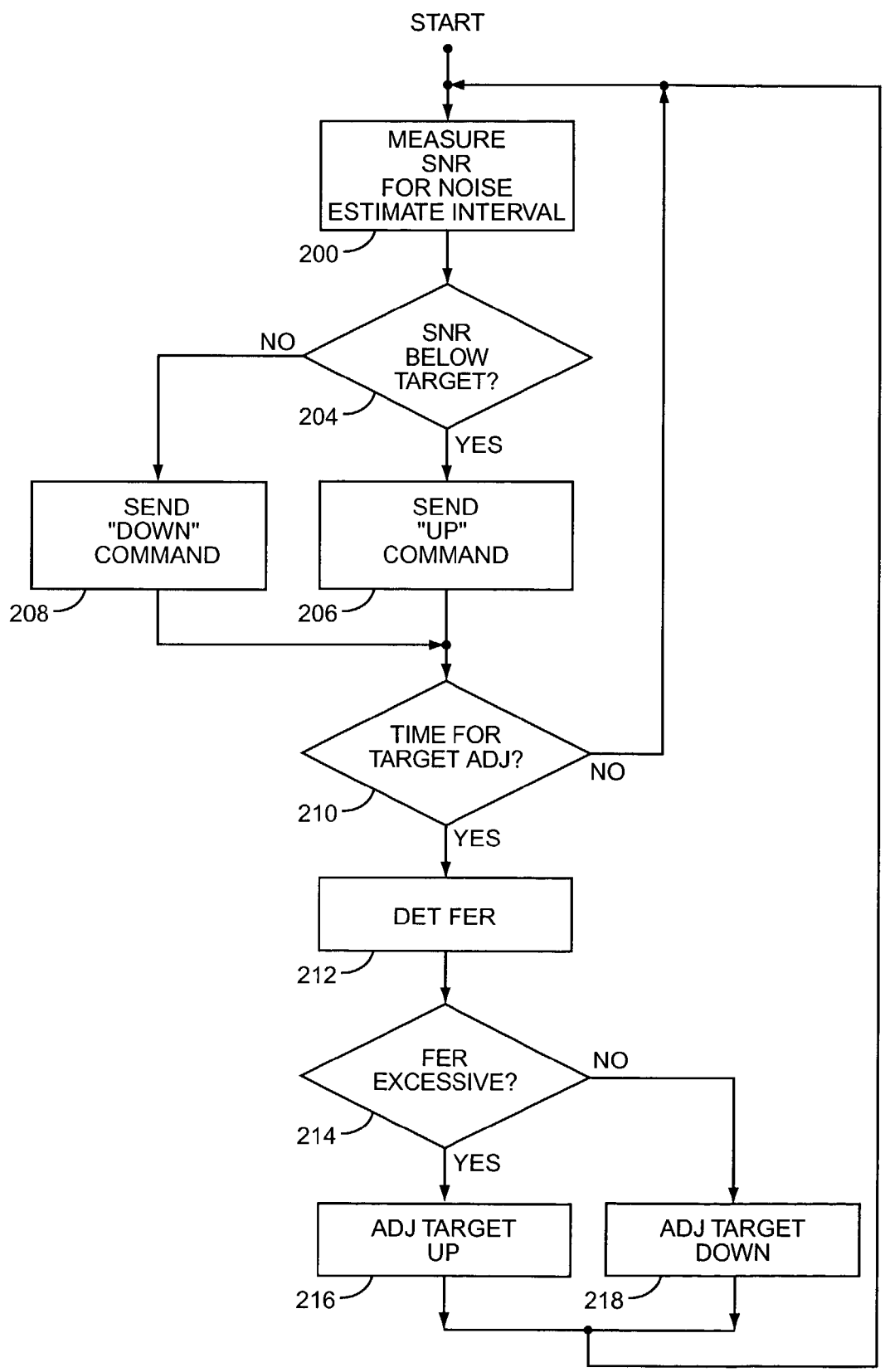
FIG. 10 is a diagram of exemplary closed loop power control logic.

As the accuracy of received signal quality determination is improved, so too is the ability to more tightly control transmit power using such a closed-loop power control scheme. FIG. 10 illustrates flow logic for practicing exemplary closed-loop power control based on the improved noise estimation offered by the present invention. Processing begins with the mobile station 14 determining a signal-to-noise ratio (SNR) for a received signal of interest (Step 200), which typically means determining the SNR of the traffic channel signal over a given noise estimation interval, based on one or other simultaneously received signals associated with the signal of interest. Exemplary details of this step are described later herein with reference to FIG. 11.

If the measured SNR is below a defined quality target (Step 204), the mobile station 14 transmits an "up" power control command or commands to the RAN 12 (Step 206). If the measured SNR is above the quality target, the RAN 12 is transmitting with unnecessarily high forward link power and the mobile station 14 thus sends one or more "down" commands (Step 208). The control response of the overall network 10 and mobile station 14 is set up such that the forward link transmit power is commanded in stable fashion up and down as needed to maintain it essentially at the level needed to "hit" or otherwise maintain the desired quality target for the received signal of interest.

The above processing operates as an "inner" control loop operating at a desired rate. For example, such power control may be based on the "fast forward power control" provisions of the cdma2000 standards, wherein the mobile station 14 sends power control commands to the network 10 at up to 800 Hz, or every 1.25 milliseconds. A slower, "outer" control loop operates on the quality target such that the required SNR threshold for the received signal of interest is moved upward if error rates become excessive, and is moved downward if the error rates for the signal of interest are below the error limit threshold. In cdma2000, adjustment of the quality target may be performed at a frame rate of 20 milliseconds. Of course, other target adjustment intervals may be used.

Thus, the exemplary logic continues with a determination of whether it is time for an adjustment of the quality target (Step 210). If not, processing continues with the next iteration of inner loop power control, i.e., a return to Step 200. If so, processing continues with the mobile station determining a current FER (Step 212), or determining some other signal quality parameter useful for outer loop control adjustment. If the FER is excessive (Step 214), the mobile station 14 adjusts the quality target upward, which effectively mandates a higher required SNR for the signal of interest (Step 216). If the FER is below the error threshold, the mobile station 14 adjusts the quality target downward (Step 218), which effectively relaxes the SNR requirements for the signal of interest.

Figure 11:
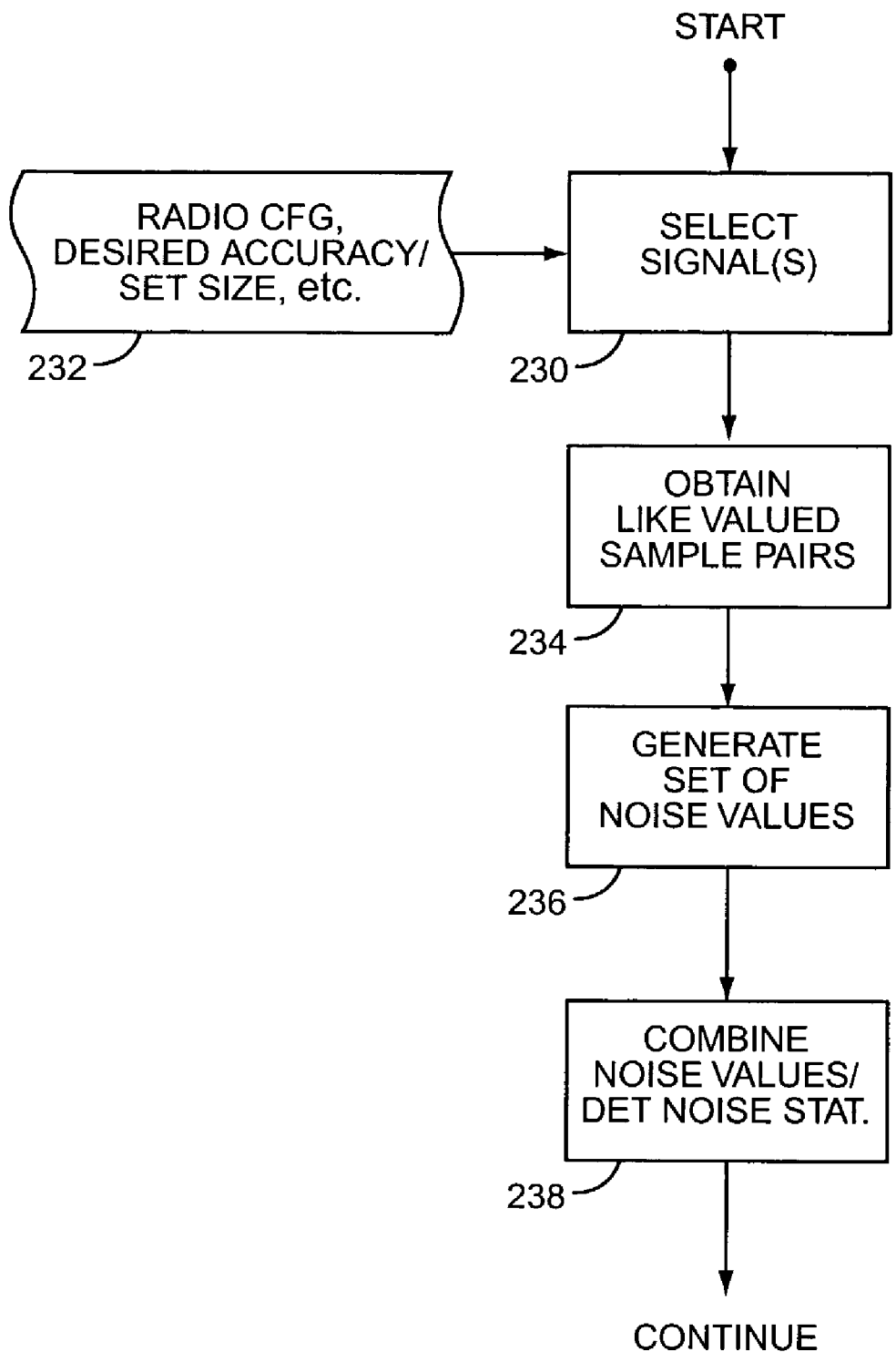
FIG. 11 is a diagram of exemplary noise estimation in accordance with the present invention for supporting the closed loop power control logic of FIG. 10.

FIG. 11 illustrates exemplary details for noise estimation according to the present invention. As noted, the mobile station 14 receives one or more messaging signals in conjunction with the signal of interest, i.e., messaging channel signals in association with a traffic channel signal. The mobile station 14 selects one or more of these messaging channel signals for use in noise estimation over the noise estimation interval of interest (Step 230). Such selection may be based on a default or fixed configuration, or may be informed by one or more dynamic or configurable parameters (Step 232). For example, the particular signal or signals selected from the available messaging channel signals might depend on a current radio configuration of the mobile phone 14, a desired sample size of noise values to be used for noise estimation, etc.

The mobile station then obtains pairs of like valued samples from each of the selected signals (Step 234), and uses these sample pairs to generate a set of noise values. In an exemplary embodiment, the mobile station 14 obtains a noise value from each sample pair by subtracting one value from the other. Because the samples in the pair have like deterministic components, i.e., the same modulated signal information, such subtraction cancels the deterministic signal components, thereby leaving the resultant difference value as representative of the noise value associated with the sample pair. Alternatively, or in combination, mobile station 14 uses the decision feedback approach to obtaining like valued sample pairs for use in noise estimation.

With its ability to obtain like valued sample pairs from modulated signals, the present invention expands the potential set of signals available for noise estimation and, therefore, increases the number of noise values that can be obtained over a given noise estimation interval. Such an increase in the sample set size improves the statistical accuracy of noise estimation. For example, suppose that over a given noise estimation interval, the mobile station 14 can obtain twelve pairs of like valued sample pairs from a given one of the messaging channel signals. By obtaining such samples from one additional such signal, the mobile station 14 can obtain an additional twelve samples, thereby doubling the size of the sample set from twelve to twenty-four. By obtaining samples from yet another such signal, the mobile station 14 expands the sample set size by another twelve samples, and so on.

While much of the above discussion focused on exemplary details consistent with cdma2000 implementations, those skilled in the art will appreciate that the operative concepts of the present invention apply equally to a variety of wireless networking standards. In general, the present invention provides improved noise estimation by increasing the number of noise samples obtained over a given noise estimation interval.

Such expansion of the noise sample set derives from the present invention's use like-symbol subtraction and/or decision feedback subtraction operations on the symbol values obtained from one or more modulated channel signals received in association with signal of interest. The improved noise estimation may be, in an exemplary embodiment, used to improve the closed-loop power control typically employed on the forward link of many wireless communication networks. As such, the present invention is not limited by the above exemplary details but rather is limited only by the scope of the following claims and the reasonable equivalents thereof.

What is claimed is:

1. A method of estimating noise for a received signal of interest over a noise estimation interval comprising:
   selecting a plurality of received signals that are transmitted with the received signal of interest and from which pairs of like valued samples can be obtained, to obtain selected signals for use in noise estimation;
   obtaining a sample set of noise values over the noise estimation interval from the selected signals; and
   estimating a noise statistic for the received signal of interest based on the sample set of noise values;
   wherein the number of received signals selected is based on a desired number of noise values in the sample set of noise values.

2. The method of claim 1, wherein obtaining the sample set of noise values over the noise estimation interval from the selected signals comprises:
   obtaining pairs of like valued samples from each of the selected signals; and
   subtracting one sample of each pair from the other to obtain the sample set of noise values.

3. The method of claim 2, wherein obtaining pairs of like valued samples from each of the selected signals comprises, for at least one of the selected signals, obtaining sample pairs from repeated symbols included in the at least one of the selected signals.

4. The method of claim 2, wherein obtaining pairs of like valued samples from each of the selected signals comprises despreading at least one of the selected signals at a lower-than-actual spreading gain to derive repeated symbol values, and obtaining sample pairs from the derived repeated symbol values.

5. The method of claim 2, wherein obtaining pairs of like valued samples from each of the selected signals comprises, for at least one of the selected signals, generating duplicate sample values from actual sample values obtained from the at least one of the selected signals.

6. The method of claim 5, further comprising selecting the at least one of the selected signals one or more of the plurality of received signals having a relatively high power.

7. The method of claim 5, wherein generating duplicate sample values from actual sample values comprises:
   generating hard decision values from corresponding soft decision values obtained from the at least one of the selected signals; and
   compensating the hard decision values using channel estimation parameters associated with the at least one of the selected signals.

8. The method of claim 1, wherein selecting a plurality of received signals from which pairs of like valued samples can be obtained comprises selecting at least one received signal having a repeating symbol pattern such that pairs of like valued samples can be obtained by sampling repeated symbols.

9. The method of claim 1, wherein selecting a plurality of received signals from which pairs of like valued samples can be obtained comprises selecting at least one received signal having a first CDMA spreading gain that is a multiple of a second CDMA spreading gain associated with the received signal of interest.

10. The method of claim 9, further comprising obtaining pairs of like valued samples from the at least one selected signal by despreading the at least one selected signal using the second CDMA spreading gain.

11. The method of claim 1, wherein the received signal of interest comprises a first CDMA signal and the plurality of received signals comprise at least second and third CDMA signals transmitted with the first CDMA signal, and wherein obtaining a sample set of noise values over the noise estimation interval comprises obtaining a first number of noise values from the second CDMA signal and obtaining a second number of noise values from the third CDMA signal.

12. The method of claim 11, wherein obtaining a first number of noise values from the second CDMA signal and obtaining a second number of noise values from the third CDMA signal comprise obtaining an equal number of noise values from each of the second and third CDMA signals.

13. The method of claim 11, further comprising determining a signal-to-noise ratio (SNR) for the first CDMA signal using the noise statistic determined from the second and third CDMA signals.

14. The method of claim 13, wherein the first CDMA signal comprises a traffic channel signal, such that determining the SNR for the first CDMA signal comprises determining a traffic channel SNR.

15. The method of claim 14, wherein determining a traffic channel SNR comprises:
   determining a signal strength for the traffic channel signal;
   computing a sample variance of the noise values as the noise statistic; and
   calculating the traffic channel SNR based on the signal strength and the sample variance.

16. The method of claim 14, further comprising performing closed-loop power control of the traffic channel signal based on the traffic channel SNR.

17. A mobile station for use in a wireless communication network, the mobile station including one or more processors operative to:
   select a plurality of received signals transmitted with a received signal of interest, based on the suitability of the selected received signals for obtaining pairs of like valued samples for use in noise estimation;
   obtain a sample set of noise values over a noise estimation interval using pairs of like valued samples from the selected received signals; and
   estimate a noise statistic for the received signal of interest based on the sample set of noise values;
   wherein the number of received signals selected is based on a desired number of noise values in the sample set of noise values.

18. The mobile station of claim 17, wherein the mobile station selects a given one of the plurality of received signals based on the given received signal having a repeating symbol pattern such that the pairs of like valued samples can be obtained by sampling repeated symbols.

19. The mobile station of claim 17, wherein the mobile station selects a given one of the plurality of received signals based on the given one of the plurality of received signals having a first CDMA spreading gain that is at multiple of a second CDMA spreading gain associated with the received signal of interest.

20. The mobile station of claim 19, wherein the mobile station obtains the pairs of like valued samples from the given one of the plurality of received signals based on despreading the given one of the plurality of received signals using the second CDMA spreading gain.

21. The mobile station of claim 17, wherein the mobile station selects a given one of the plurality of received signals based on a relative power level of the given one of the plurality of received signals.

22. The mobile station of claim 21, wherein the mobile station obtains the pairs of like valued samples from the given one of the plurality of received signals based on generating duplicate sample values from actual sample values obtained from the given one of the plurality of received signals.

23. The mobile station of claim 22, wherein the mobile station includes a signal demodulator and generates the duplicate sample values by modifying hard decision values output by the signal demodulator using one or more channel estimation parameters associated with the given one of the plurality of received signals.

24. The mobile station of claim 17, wherein the mobile station obtains the sample set of noise values over the noise estimation interval by obtaining pairs of like valued samples from each of the plurality of received signals, and subtracting one sample of each pair from the other to obtain the sample set of noise values.

25. The mobile station of claim 17, wherein the received signal of interest comprises a first CDMA signal and the plurality of received signals comprise at least second and third CDMA signals transmitted simultaneously with the first CDMA signal, and wherein the mobile station obtains the sample set of noise values by obtaining a first number of noise values from the second CDMA signal and obtaining a second number of noise values from the third CDMA signal.

26. The mobile station of claim 25, wherein the mobile station obtains an equal number of noise values from the second and third CDMA signals over the noise estimation interval.

27. The mobile station of claim 25, wherein the mobile station determines a signal-to-noise ratio (SNR) for the first CDMA signal using the noise statistic determined from the second and third CDMA signals.

28. The mobile station of claim 27, wherein the first CDMA signal is a traffic channel signal, and at least one of the second and third CDMA signals comprises a messaging channel signal associated with the traffic channel signal, and wherein the mobile station determines the SNR as a traffic channel SNR.

29. The mobile station of claim 28, wherein the mobile station determines the traffic channel SNR based on:
   determining a signal strength for the traffic channel signal;
   computing a sample variance of the noise values as the noise statistic; and
   calculating the traffic channel SNR based on the signal strength and the sample variance.

30. The mobile station of claim 28, wherein the mobile station performs closed-loop power control of the traffic channel signal based on the traffic channel SNR.

* * * * *

UNITED STATES PATENT AND TRADEMARK OFFICE
CERTIFICATE OF CORRECTION

PATENT NO. : 7,313,167 B2 Page 1 of 1
APPLICATION NO. : 10/260650
DATED : December 25, 2007
INVENTOR(S) : Yoon et al.

It is certified that error appears in the above-identified patent and that said Letters Patent is hereby corrected as shown below:

Title Page, Item (73), under "Assignee", after "(publ)" insert -- , Stockholm --.

In Fig. 8, Sheet 8 of 11, delete "1,2" and insert -- 1.2 --, therefor.

In Column 9, Line 1, delete "cdma200" and insert -- cdma2000 --, therefor.

In Column 9, Line 27, in "TABLE 1", delete "46, 46, 45" and insert -- 47, 46, 45 --, therefor.

In Column 10, Line 66, delete "cdma200" and insert -- cdma2000 --, therefor.

In Column 12, Line 37, delete " $b(n)$ " and insert -- $\hat{b}(n)$ --, therefor.

Signed and Sealed this

Fourteenth Day of October, 2008

JON W. DUDAS
*Director of the United States Patent and Trademark Office*